US011391962B1

(12) United States Patent
Hatfield et al.

(10) Patent No.: US 11,391,962 B1
(45) Date of Patent: Jul. 19, 2022

(54) HEAD MOUNTED DISPLAY NOSEPIECE

(71) Applicant: Lenovo (United States) Inc., Morrisville, NC (US)

(72) Inventors: Nathan Hatfield, Raleigh, NC (US); Matthew Manuel Davis, Durham, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 0 days.

(21) Appl. No.: 17/139,512

(22) Filed: Dec. 31, 2020

(51) Int. Cl.
*G06F 1/16* (2006.01)
*G02C 5/12* (2006.01)

(52) U.S. Cl.
CPC ............ *G02C 5/126* (2013.01); *G06F 1/163* (2013.01); *G06F 1/1637* (2013.01)

(58) Field of Classification Search
CPC ........ G02C 5/126; G06F 1/163; G06F 1/1637
See application file for complete search history.

(56) References Cited

U.S. PATENT DOCUMENTS

| 8,847,851 | B2 * | 9/2014 | Yamamoto | G02B 27/0172 345/8 |
| 9,341,851 | B2 * | 5/2016 | Hiraide | G02B 27/0179 |
| 10,130,252 | B2 * | 11/2018 | Chuang | A61B 3/04 |
| 10,268,433 | B2 * | 4/2019 | Shibata | G06F 3/03547 |
| 10,718,950 | B2 * | 7/2020 | Kamakura | G02B 27/0176 |
| 11,113,889 | B1 * | 9/2021 | Castañeda | G06F 3/011 |
| 2019/0377195 | A1 * | 12/2019 | Montalban | G02C 5/126 |
| 2021/0191680 | A1 * | 6/2021 | Han | G06F 3/0482 |

FOREIGN PATENT DOCUMENTS

| CN | 111338082 A | * | 6/2020 |
| CN | 210776065 U | * | 6/2020 |
| CN | 111856750 A | | 10/2020 |
| DE | 3429089 A1 | | 3/1986 |
| EP | 2 105 781 A1 | | 9/2009 |

OTHER PUBLICATIONS

Fundamentals of ophthalmic dispensing—2 Everyday face, frame and centration measurements, Optician Jun. 21, 2019 (https://www.opticianonline.net/cet-archive/5400) (14 pages).
Mad Gaze—Ares, User Manual, Version 1.0, Mad Gaza (Hong Kong) (2016) (40 pages).
Mad Gaze—Vader Use Guidelines, v1.0, Mad Gaze (Hong Kong) (2018) (17 pages).
Magic Leap One, Creator Edition, Quick Start Guide, Magic Leap, Inc. (2018) (16 pages).
EP Application No. 21 21 7693.7-1020, Extended European Search Report, dated May 13, 2022 (8 pages).

* cited by examiner

*Primary Examiner* — Rockshana D Chowdhury
(74) *Attorney, Agent, or Firm* — Brian J. Pangrle

(57) ABSTRACT

A headset can include at least one display; virtual reality circuitry operatively coupled to the at least one display; and a display frame that includes a nosepiece coupling and a nosepiece received in part by the nosepiece coupling, where the nosepiece includes a ball, an extension, a carrier and nose pads coupled to the carrier, where the carrier is rotatable via the ball and translatable via the extension.

18 Claims, 10 Drawing Sheets

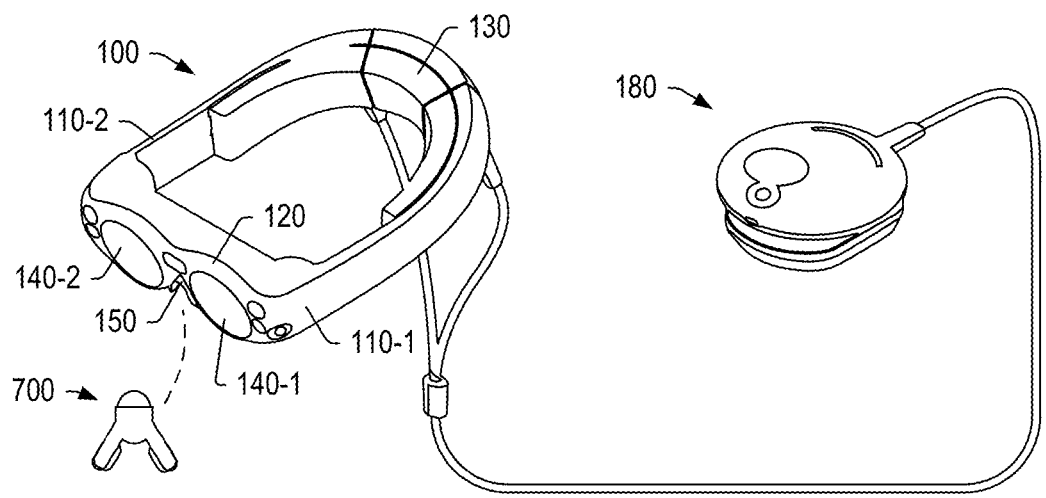
FIG. 1A
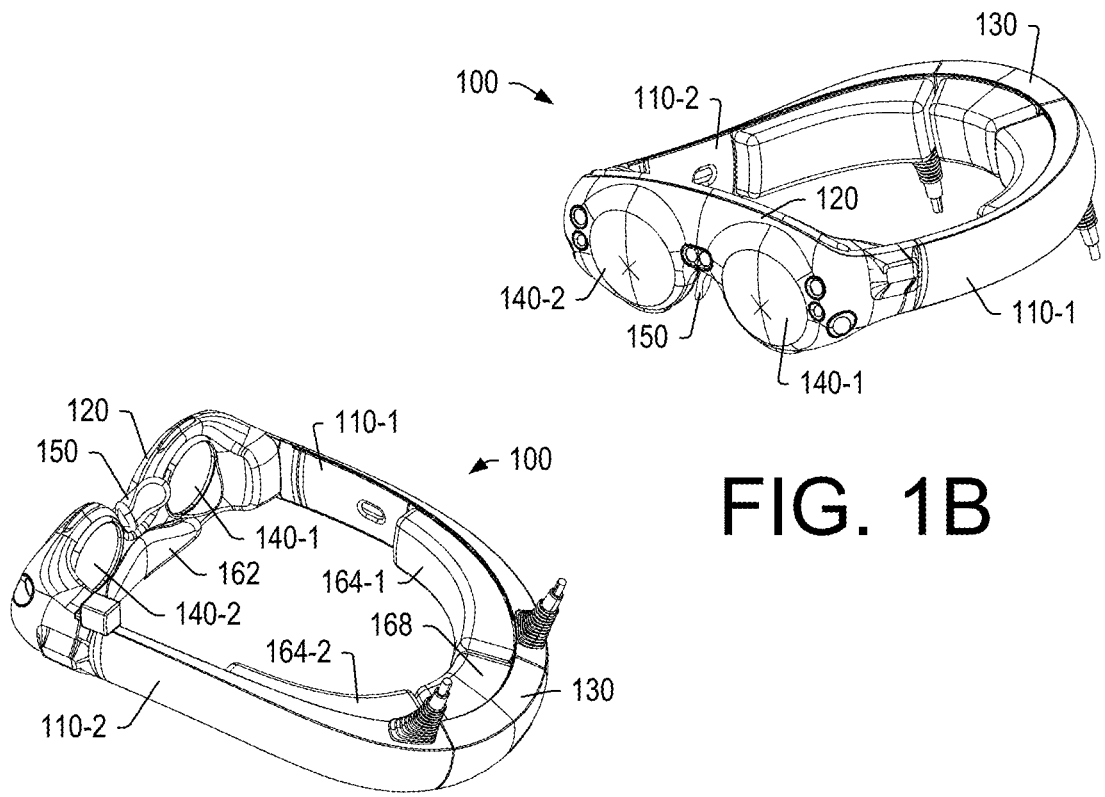
FIG. 1B
FIG. 1C

HEAD MOUNTED DISPLAY NOSEPIECE

TECHNICAL FIELD

Subject matter disclosed herein generally relates to head mounted display devices and systems.

BACKGROUND

A head mounted display can include at least one display where at least a portion of the mass of the head mounted display is supported on a wearer's nose using a nosepiece.

SUMMARY

A headset can include at least one display; virtual reality circuitry operatively coupled to the at least one display; and a display frame that includes a nosepiece coupling and a nosepiece received in part by the nosepiece coupling, where the nosepiece includes a ball, an extension, a carrier and nose pads coupled to the carrier, where the carrier is rotatable via the ball and translatable via the extension. Various other apparatuses, assemblies, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

FIG. 1A, FIG. 1B and FIG. 1C show perspective views of an example of a head mounted display;

DETAILED DESCRIPTION

Figure 2A:
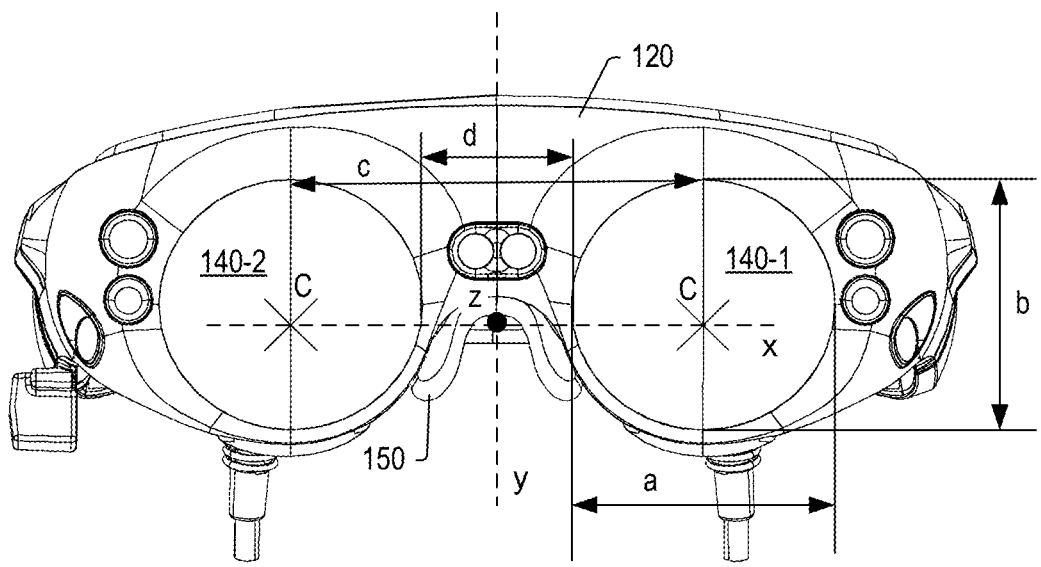
FIG. 2A and FIG. 2B show views of an example of a head mounted display.

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

FIG. 1A shows an example of a virtual reality headset (VR headset) 100 that can be utilized with a fixed nosepiece 150 or an adjustable nosepiece 700. As an example, a VR headset can include an adjustable nosepiece, which may be an original equipment manufacturer (OEM) nosepiece of the VR headset manufacturer. As shown in FIG. 1A, the VR headset 100 can be operatively coupled to a unit 180, which can include various types of circuitry (see, e.g., FIG. 3) and/or power sources.

FIG. 1B and FIG. 1C show perspective views of the VR headset 100. As shown, the VR headset 100 can include left and right temples 110-1 and 110-2 that are operatively coupled a display frame 120 and to a back piece 130 where the display frame 120 can include left and right eyepieces 140-1 and 140-2 that may be associated with a single display or multiple displays (e.g., the display frame 120 can support one or more displays). As shown, the nosepiece 150 can be coupled to the display frame 120 substantially between the eyepieces 140-1 and 140-2 to support the VR headset 100 on the nose of a wearer. As shown in FIG. 1C, the VR headset 100 can include various pads 162, 164-1, 164-2, and 168 where the pad 162 is a forehead pad coupled to the display frame 120, where the pads 164-1 and 164-2 are temple pads coupled to the temples 110-1 and 110-2, and where the pad 168 is a back pad coupled to the back piece 130.

As an example, a headset can include at least one display; virtual reality circuitry operatively coupled to the at least one display; and a display frame that includes a nosepiece coupling and a nosepiece received in part by the nosepiece coupling, where the nosepiece can include, for example, a ball, an extension, a carrier and nose pads coupled to the carrier, where the carrier is rotatable via the ball and translatable via the extension. Such a nosepiece can be referred to as an adjustable nosepiece. Such a nosepiece can be referred to as an articulating ball joint nosepiece that can improve wearability of a head mounted display system such as, for example, the VR headset 100.

FIG. 2A shows a front view of the VR headset 100 along with a Cartesian coordinate system with x, y and z axes. As shown, the Cartesian coordinate system can have an origin that is defined by a mid-point of the display frame 120 and points on the eyepieces 140-1 and 140-2.

The VR headset 100 can be defined using various measurements that may relate to measurements of facial features that relate to wearing of the VR headset 100. A wearer may aim to achieve a comfortable fit that is also a function fit such that the wearer has an acceptable VR experience or other display viewing experience.

In the example of FIG. 2A, a so-called boxed lens (boxing) system may be utilized to describe various features, for example, as described in British Standard EN ISO 8624:2011+A1:2015(E), which uses rectangles that contain each lens shape to determine the dimensions of the front of the frame.

In the box system of measuring spectacle fronts, a parameter C is the box center, a parameter a is a horizontal lens size, a parameter b is a vertical lens size, a parameter c is a boxed center distance (BCD), and a parameter d is a distance between lenses (DBL). FIG. 2A shows locations demarcating the parameters C, a, b, c and d.

As an example, a line joining and extending beyond the centers of the rectangles (the box centers) can be referred to as the horizontal center line (HCL). In selecting a frame for a wearer, an eye vision specialist may align the frame HCL with the lower limbus (bottom of the iris)/lower eyelid and as such a line connecting the right and left lower limbus may be considered to be a facial version of HCL when measuring for a handmade frame in the traditional sense. In various instances, there can be exceptions, for example specifying a handmade half eye, making an extra deep frame, or when styling a classic round eye style where the pupil center is required to be on box center rather than 5 mm or 6 mm above HCL. In such instances, a facial HCL which is used to determine bridge measurements such as crest height will be different to the HCL that joins the box centers and becomes an individual feature of the design that can be translated into standard measurements for proper understanding.

As an example, the horizontal box size may be referred to as the eye size and the DBL as the bridge. Such measurements may be found printed on frames, usually in combination with the total side length. As an example, the box center distance (BCD) may be referred to as the frame PD. In the example of FIG. 2A: BCD, c=a/2+d+a/2=a+d where Frame PD=Eye Size+DBL.

For eyeglasses, the frame PD can be utilized such that a patient's actual PD is not to be greater than the frame PD, otherwise the eyes can be outset in the frame, which may look odd and restrict the patient's temporal field of view.

Figure 2B:
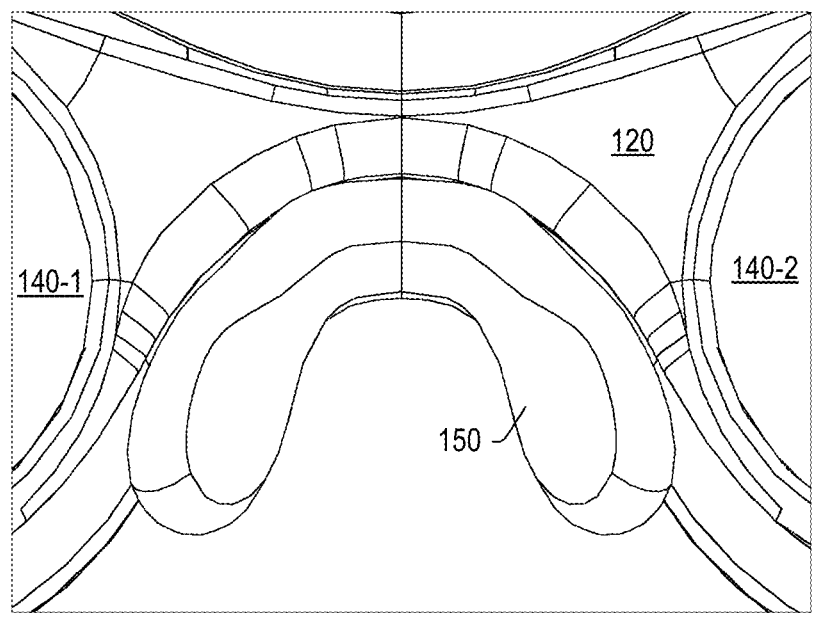

FIG. 2B shows the nosepiece 150 as coupled to the display frame 120. As shown, the nosepiece 150 is not adjustable and substantially fixedly disposed between the eyepieces 140-1 and 140-2, for example, substantially within the distance of the parameter d. Such a non-adjustable nosepiece can be sub-optimal for various wearers and pose problems for manufacturers as a VR headset manufacturer is not likely to create a wide range of display frames, temples, etc., such as a manufacturer of eyeglasses. As explained above, various features of a display frame can relate to wearability and wearer experience.

FIG. 3A shows an example of a wearer 301 that has hair 303 on her head 302, a nose 304, eyes 305, a mouth 306 and ears 307 where the wearer 301 is wearing the VR headset 100. As shown, the VR headset 100 can include a nosepiece coupling 128 that can receive prongs 158 of one of a number of non-adjustable nosepieces 150-1, 150-2, 150-3, and 150-4. Each of the non-adjustable nosepieces 150-1, 150-2 and 150-3 has a spacer of a different length $\Delta y_p$ to allow a user to select one of the non-adjustable nosepieces 150-1, 150-2 and 150-3 for a best fit, which may still be a sub-optimal fit. As shown, the non-adjustable nosepiece 150-4 can have a bent spacer defined by an arc length $\Delta r_p$.

In eyeglasses, an angle of side or side angle is defined in BS 3521: Part 2: 1991 as the vertical angle between a normal to the back plane of the front and the line of the side when opened. Another angle is the pantoscopic angle or pantoscopic tilt, which is related to the angle of side. Pantoscopic tilt is defined as a lens tilt about the horizontal axis, with respect to primary gaze of a subject. Simplistically, it can be explained as the rotation of lens bottom towards the cheeks. Pantoscopic tilt for eyeglasses may range, for example, from 0 degrees to 15 degrees where tilt of 3 degrees to 7 degrees may be considered normal.

In general eyeglass fitting, pantoscopic tilt can be taken to be the same for right and left (e.g., unless for example the bridge is twisted); whereas, it can be quite common for angles of side to be different if a patient has one ear higher than the other. For example, right and left temples can differ in angle of side to achieve a common pantoscopic tilt for right and left eyes. As an example, for eyeglasses, a pantoscopic tilt may be increased by increasing the right and left angles of side by the same amount. Compensation of the pantoscopic tilt to allow for optical center heights can often be undertaken; noting that, in many cases, an "as worn" pantoscopic tilt may be the best that can be achieved rather than one that allows the optimum performance of the lens, particularly if it is aspheric.

Figure 3:
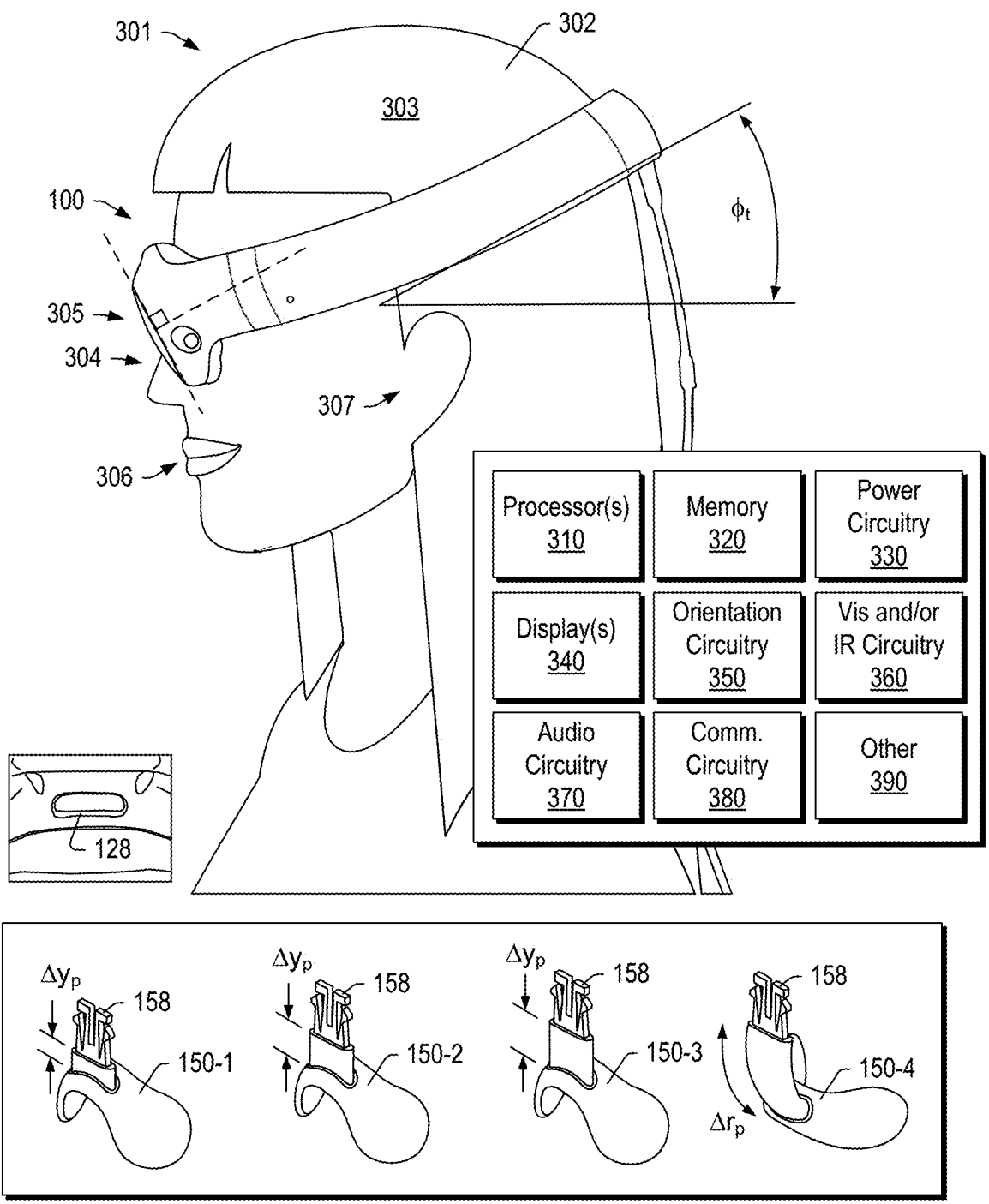
FIG. 3 is a series of views of an example of a head mounted display system with reference to a head of a wearer.

In FIG. 3, an angle $\phi_t$ is shown with respect to horizontal, which may approximate a pantoscopic tilt (e.g., pantoscopic angle or pantoscopic tilt angle). For example, consider a dashed line that is approximately normal to a plane of an eyepiece. As an example, a pantoscopic tilt for a VR headset can differ from that of eyeglasses with prescription lenses. Such a difference can be in range, which may be due in part to positioning of one or more displays in the VR headset, for example, consider one or more displays supported by the display frame 120.

In the example of FIG. 3, the VR headset 100 can include various types of circuitry, which can include one or more processors 310, memory 320 accessible to at least one of the one or more processors 310, power circuitry 330, one or more displays 340, orientation circuitry 350, visible and/or infrared (IR) circuitry 360 (e.g., as locating circuitry, etc.), audio circuitry 370, communication circuitry 380 and optionally one or more other types of circuitry 390.

As an example, the one or more displays 340 may include two OLED displays with a combined resolution in excess of 1000×600, with a suitable refresh rate in excess of approximately 30 Hz. As an example, the orientation circuitry 350 can include one or more of an accelerometer, a gyroscope, and a magnetometer. As an example, the visible and/or IR circuitry 360 can include one or more IR emitters, one or more IR detectors, one or more visible wavelength detectors, etc. As an example, the audio circuitry 370 can include one or more speakers (e.g., earphone speakers) and/or one or more wireless transmitters (e.g., BLUETOOTH, etc.).

As an example, a VR headset can include circuitry such as a TOSHIBA TC358870XBG 4K HDMI to MIPI dual-DSI converter, a CYPRESS CYUSB3304 USB 3.0 hub controller, a ST MICROELECTRONICS STM32F072VB ARM CORTEX-M0 32-bit RISC core microcontroller, a WINBOND W25Q64FVIG 64 Mb serial flash memory, a NORDIC SEMICONDUCTOR nRF51822 BLUETOOTH smart and 2.4 GHz system on a chip (SoC), a CMEDIA CM119BN USB audio controller, a BOSCH SENSORTEC BMI055 6-axis inertial sensor, multiple TEXAS INSTRUMENTS TLC59401 16-channel LED driver with dot correction and grayscale PWM control, etc.

As an example, a VR headset can include one or more of a QUALCOMM SNAPDRAGON processor, SK HYNIX SRAM, a heat sink, a battery such as, for example, a 18650 battery format 2600 mAh battery, a microphone, an antenna, etc. As to the 18650 battery format, it can be approximately 65 mm (2.56 in) long or may be approximately 68 mm (2.68 in) long with an internal protection circuit (e.g., longer than an AA format battery).

As an example, a VR headset can include one or more features of the OCULUS GO VR headset. As an example, a VR headset can include a QUALCOMM SNAPDRAGON 821 SoC, 3 GB of LPDDR4 RAM, 32 GB or more of internal storage, an integrated ADRENO 530 GPU (e.g., approximately 500 GFLOPS of graphics performance), a 2600 mAh battery, non-positional three-degrees of freedom tracking, one or more proximity sensors, an accessory controller, a 5.5-inch LCD display with a 2560×1440 (1280× 1440 pixels per eye) resolution in an RGB-stripe subpixel arrangement, a field of view of approximately 100 degrees (e.g., a horizontal pixel density of approximately 12.67 pixels per degree), and Fresnel lenses.

As an example, a VR headset can include one or more features of the MAGIC LEAP VR headset. For example, consider one or more of a NVIDIA TEGRA X2 SoC with two DENVER 2.0 64-bit cores and four ARM CORTEX A57 64-bit cores, an integrated Pascal-based GPU with 256 CUDA cores, 8 GB RAM, 128 GB onboard storage, BLUETOOTH 4.2, Wi-Fi 802.11ac/b/g/n, a USB-C connector, a 3.5 mm headphone jack, etc. The MAGIC LEAP VR headset utilizes waveguide display technology where a substantially transparent screen is illuminated from a side. In such an example, a waveguide (e.g., a photonic lightfield chip) guides light (e.g., imagery) across a thin layer of glass, magnifying it and angling it into a wearer's eye. As to focus planes, imagery can be in focus all of the time; however, some things can look crisp while others can look blurry, depending on where a wearer's eye is focused, where such an effect is achieved by stacking multiple waveguides to create focus planes, for example, slicing up an image into crisp and blurry areas. The MAGIC LEAP VR headset includes an OMNIVISION OP02222 field-sequential color (FSC) LCOS device (e.g., customized variation of the OMNIVISION OP02220) that is an optical system for injecting images into the waveguides. The MAGIC LEAP VR headset includes a cast magnesium block that holds optics and sensors.

As to sizing, the MAGIC LEAP VR headset is available in two sizes, Size 1 and Size 2. The wearer's interpupillary distance (IPD) can be utilized to help select Size 1 or Size 2 where an IPD less than 65 mm corresponds to Size 1 and equal to or greater than 65 mm corresponds to Size 2. For the MAGIC LEAP VR headset, approximately 65 to 75 percent purchase Size 1, which is recommended if the VR headset is to be shared (e.g., multiple different wearers).

As explained above with respect to FIG. 2A, the box center distance (BCD) may be referred to as the frame PD, which may be an approximate interpupillary distance (IPD) (e.g., frame interpupillary distance, frame PD).

As to dimensions of a VR headset, consider, as an example, dimensions of approximately 190 mm×105 mm×115 mm (7.48 in×4.13 in×4.53 in) and, for example, a mass of approximately 468 g (1.032 lb) (e.g., OCULUS VR headset).

Some other examples of VR headsets include the MICROSOFT HOLOLENS VR headset, the META 2 VR headset, which works in conjunction with a PC or laptop, and the GOOGLE GLASS VR headset.

As an example, a VR headset can be associated with a software development kit (SDK). As an example, a VR headset can include tracking sensor circuitry, which may include programmable instructions (e.g., firmware, software, etc.). As an example, a VR headset can include communication circuitry that can be operatively coupled to the Internet, for example, for virtual reality content to be downloaded and rendered.

Figure 4:
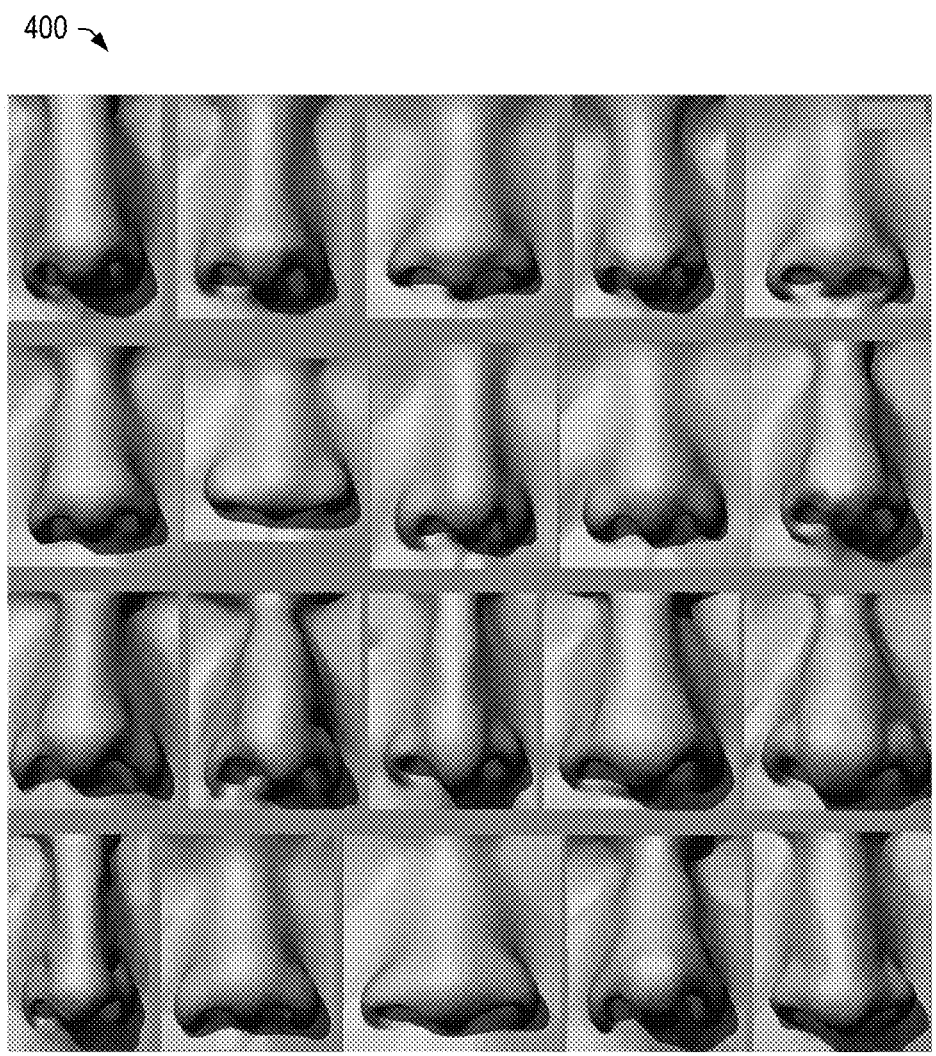
FIG. 4 is a series of graphics of examples of human noses.

FIG. 4 shows various graphics of noses 400. As shown, the human nose can vary in shape and size. The human nose is a most protruding part of the face and includes nostrils where shape of the nose is determined at least in part by the nasal bones and the nasal cartilages, including the nasal septum which separates the nostrils and divides the nasal cavity into two. On average the nose of a male is larger than that of a female. The average length of an adult male's nose is 56 mm (2.2 in) long, while a woman's is 51 mm (2 in) long.

The nasal root is the most depressed, superior part of the nose along the nasal ridge; the nasion is the midline point just superior to the nasal root overlying the naso-frontal suture; the nasal bridge is a saddle-shaped area that includes the nasal root and the lateral aspects of the nose that lies between the glabella and the inferior boundary of the nasal bone, and extends laterally to the inner canthi; the nasal ridge is the midline prominence of the nose, extending from the nasal root to the tip (also called the dorsum of the nose); the nasal base is an imaginary line between the most lateral points of the external inferior attachments of the alae nasi to the face; the nasal tip is the junction of the inferior margin of the nasal ridge and the columella, which tends to be the part of the nose that is furthest from the plane of the face; the ala is the tissue that includes the lateral boundary of the nose, inferiorly, surrounding the naris; and the columella is the tissue that links the nasal tip to the nasal base, and separates the nares and is the inferior margin of the nasal septum.

As an example, a nosepiece can include pads that contact a human nose between the nasion and the tip and more particularly between the root and the tip along the length that corresponds to the nasal ridge. As an example, a nosepiece can include pads that contact a human nose where a distance between the pads is less than the span of the nasal base.

As explained with respect to FIG. 3, a head mounted display can come in a couple of sizes where it may have a non-adjustable nosepiece that may be selected from a number of non-adjustable nosepieces (e.g., less than 10). As explained, the MAGIC LEAP VR headset has five non-adjustable nosepieces that are interchangeable. However, these different non-adjustable nosepieces may not accommodate specific nuances associated with nose size and shape (e.g., splay angle, crest angle, etc.).

Figure 5A:
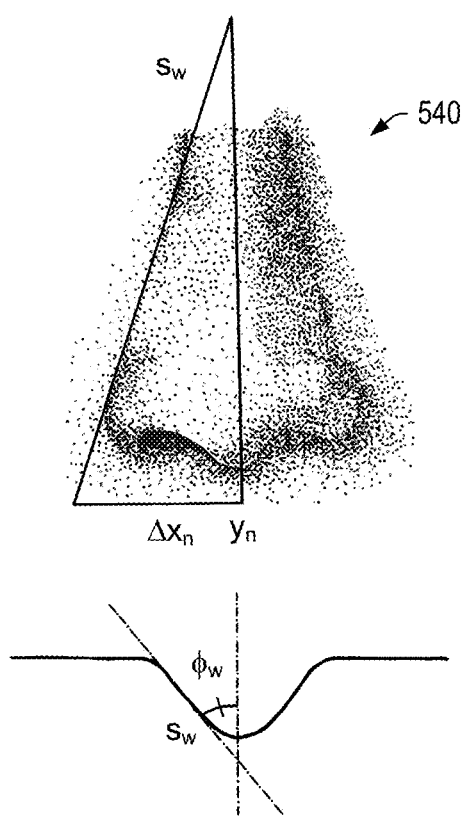
FIG. 5A and FIG. 5B are a front view and a side view of an example of a human nose.
Figure 5B:
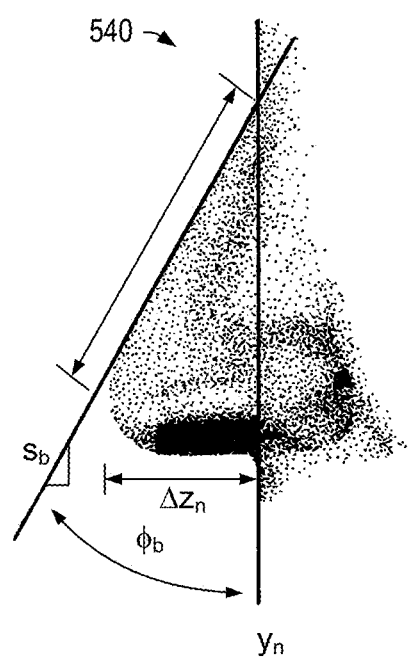

FIG. 5A and FIG. 5B show an example of a nose 540 along with splay angle $\phi_w$ and crest angle $\phi_b$. In FIG. 5A, a slope $s_w$ is shown with reference to x and y coordinates, which are defined as $x_n$ and $y_n$ where "n" refers to "nose". In FIG. 5B, a slope $s_b$ is shown with reference to z and y coordinates, which are defined as $z_n$ and $y_n$ where "n" refers to "nose".

As an example, a head mounted display may be constrained by mechanical components that, when aggregated, impose undue pressure on the bridge of the nose. As explained, a head mounted display can be provided with a relatively small number of assorted non-adjustable nosepieces that aim to allow users with different, varied nose profiles to select a best fitting option, which may be sub-optimal.

As an example, an adjustable nosepiece such as, for example, the nosepiece 700 of FIG. 1A, may be provided with a head mounted display such as, for example, a VR headset. As an example, an adjustable nosepiece can be articulated in such a way as to accommodate nose profiles that are inherently different across various dimensions. For example, consider dimensions including crest angle, the angle of the nose from the base to the top compared with a vertical plane roughly parallel to the brows and cheeks; and the splay angle, the angle formed by the side of the nose as viewed from the top; and the angle of approach, the angle at which the nose piece extends from the chassis to make contact with the nose. Each constituent feature that makes up the profile of the nose can vary, which may vary due to the relatively small genetic variations amongst humans that give rise to phenotype variations.

To resolve overall fit adjustments that are afforded to users with diverse nose profiles, a head mounted display can include an adjustable nosepiece, which may be adjustable via a ball joint mechanism. In such an example, a ball socket may be part of a display frame or coupled to a display frame.

As an example, a ball joint may allow users to articulate an adjustable nosepiece. For example, a ball joint can be able to rotate inward and forward, accommodating an aggressive or less aggressive angle of approach, and can allow for a suitable amount of travel to allow users to extend or retract the height of the nosepiece to accommodate various crest heights/angles.

As an example, an adjustable nosepiece can include an extendable segment, which may be fixed to a portion of the nosepiece and provide some amount of friction to feed into a ball joint. In such an example, once fed into the ball joint, the extendable segment can be retracted to decrease the height of the nosepiece, or extended to increase the height of the nosepiece.

As an example, a ball joint may provide for swappability of an adjustable nosepiece, where one or more users can insert a style and/or shape of nosepiece while maintaining finer adjustments permitted by an articulating ball joint.

Figure 6:
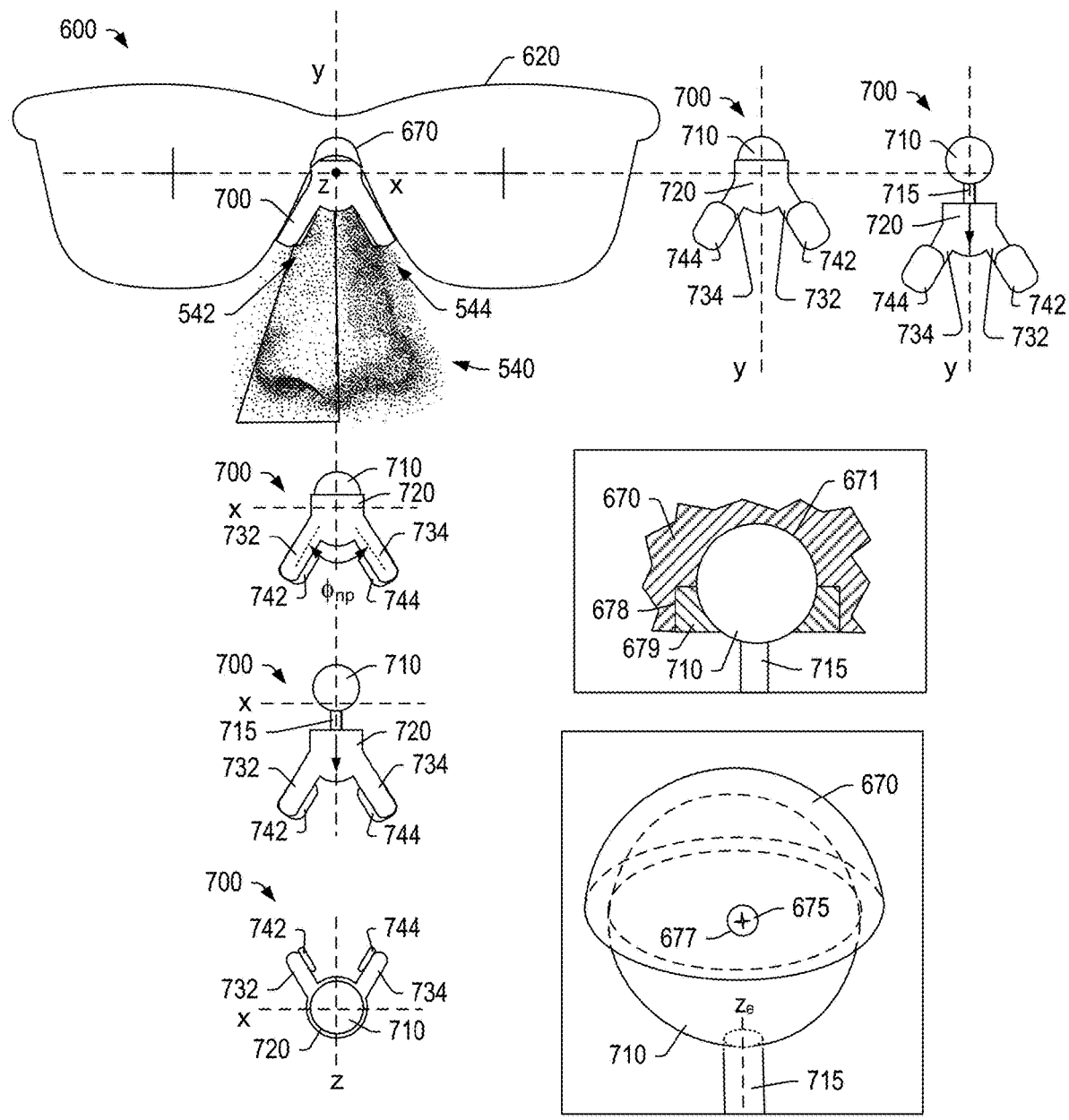
FIG. 6 is a front view of an example of a head mounted display with respect to an example of a wearer's nose and various views of an adjustable nosepiece.

FIG. 6 shows an example of a head mounted display system 600 that can be a VR headset. As shown, the system 600 includes a display frame 620, a nosepiece coupling 670 and the nosepiece 700 in contact with a left side 542 and a right side 544 of a nose 540.

As shown in FIG. 6, a Cartesian coordinate system can be utilized to define various features, which can include adjustable features of the nosepiece 700, which can be adjustable without removal from the nosepiece coupling 670. As an example, the nosepiece 700 may be adjustable at least in part where the nosepiece 700 is removably attached to the display frame 620. As an example, one or more types of coordinate systems may be utilized (e.g., spherical, cylindrical, Cartesian, etc.) to describe one or more features of the nosepiece 700, which may be with respect to a human nose, a headset, etc.

As shown, the nosepiece 700 can be adjustable along the y-axis. For example, the nosepiece 700 can include a ball 710, an extension 715, and a carrier 720 with two legs 732 and 734 where the leg 732 includes a pad 742 and where the leg 734 includes a pad 744. As an example, the carrier 720 may be made at least in part of a deformable material such that the legs 732 and 734 may be adjustable or the legs 732 and 734 may be made at least in part of a deformable material. For example, consider a metal core with an elastomeric cover where the metal core may be adjustable in a manner where the elastomeric cover is deformable to conform to adjustments to the metal core. In such an example, the leg 732 can include a metal core and the leg 734 can include a metal core. In the example of FIG. 6, an angle $\phi_{np}$ is shown as an angle that is defined between the legs 732 and 734, which can be integral portions of the carrier 730 or, for example, may be separable portions of the nosepiece 700. As an example, the angle $\phi_{np}$ may be adjustable.

In the example of FIG. 6, the nosepiece coupling 670 of the display frame 620 can be a ball socket that can receive the ball 710. In such an example, a ball joint can be formed where a centroid of the ball socket is substantially aligned with a centroid of the ball 710. In such an example, some amount of friction can exist between a surface of the ball socket and a surface of the ball 710. As an example, the ball 710 may be received by the ball socket via an interference fit (e.g., a press fit). For example, the ball 710 and/or the ball socket may be made at least in part from an elastically deformable material that can deform elastically responsive to force such that the ball 710 can be received in the ball socket of the nosepiece coupling 670. As an example, one or more magnets may be utilized for coupling, friction, etc. For example, consider magnetic attraction force between the nosepiece coupling 670 and the ball 710, which may be achieved through use of one or more permanent magnets and/or one or more electromagnets.

As an example, the system 600 may include one or more sensors that can sense an orientation of the nosepiece 700 with respect to the display frame 600. In such an example, an orientation may be sensed and saved to memory for a particular wearer. As an example, where the system 600 is to be utilized with multiple wearers, stored orientation information may be recalled for purposes of guiding a wearer to adjust the nosepiece 700 to a previously utilized orientation. For example, the system 600 can include memory that can store information for wearer 1, wearer 2, etc. As an example, in guiding a wearer, information may be rendered to one or more displays, one or more speakers, etc. As an example, a haptic component may be included that can generate force, respond to force, etc., where the haptic component may be operatively coupled to the nosepiece 700. As an example, a haptic component may generate force that can be sufficient to cause the ball 710 of the nosepiece 700 to be rotated to move to a particular orientation (e.g., with respect to the extension 715).

As an example, a nosepiece may be automatically adjustable via one or more actuators, which may, for example, be guided by one or more sensors. As an example, consider utilization of one or more electromagnets that can be controllable to rotate the ball 710, which may include one or more magnets, magnetically attractive material, etc. As an example, an electromagnetic approach may utilize one or more of attractive and repulsive forces to cause at least a portion of a nosepiece to move.

As an example, a system can include one or more eye and/or other facial feature readers. In such an example, the system may automatically adjust a display frame and/or one or more displays thereof, for example, with respect to one or more pupil positions, pupil dimensions, etc. As an example, a system can include one or more accelerometers, gyroscopes, piezoelectric force sensors, etc. In such an example, the system may determine one or more angles, optionally in combination with force (e.g., F=ma) to adjust pressure applied to one or more regions of a wearer's nose. For example, a pantoscopic tilt may be adjustable for proper alignment with a wearer's pupils in a manner that may account for an amount of force applied to the wearer's nose by a nosepiece such as, for example, the nosepiece 700.

As an example, one or more features of a motion system described in an article by Bai et al., entitled "A two-mode six-DOF motion system based on a ball-joint-like spherical motor for haptic applications", Computers & Mathematics with Applications, Volume 64, Issue 5, September 2012, pp. 978-987 (https://doi.org/10.1016/j.camwa.2012.02.037), which is incorporated by reference herein, may be utilized. The article by Bai et al. describes a ball-joint-like spherical motor capable of offering smooth, continuous multi-DOF motion where, in a two-mode configuration, it can be operated as a joystick manipulating a target in six degrees-of-freedom (DOF), and provides realistic force/torque feedback in real-time. Through use of magnetic field measurements, orientation and torque-to-current coefficients can be computed in parallel, which can reduce error accumulation that may be found in multi-DOF robotic devices. As an example, a nosepiece and a nosepiece coupling may form a ball joint that can be electromagnetically active for one or more purposes.

As mentioned, a system can include various types of circuitry, which may generate heat. As an example, a nosepiece can include one or more features that may aid in dissipation of heat generated by circuitry during operation of a system. For example, consider the ball 710 being made of a conductive metal (e.g., alloy, composite, etc.) that can be in thermal communication with one or more circuits, optionally via a conductive material, etc. As an example, the carrier 720 may include one or more features that can help to dissipate heat energy where the carrier 720 can be in thermal communication with the ball 710, for example, via the extension 715 and/or via contact where the ball 710 is received at least in part in a portion of a socket of the carrier 720. As an example, the pads 742 and 744 may be thermal insulators such that thermal energy is not substantially communicated to the nose of a wearer. For example, a thermal insulator and a thermal conductor may be characterized in a relative manner where a thermal insulator can have a thermal conductivity that is less than a thermal conductivity of a thermal conductor. For example, aluminum has a thermal conductivity of approximately 237 W/(mK) and polyurethane foam has a thermal conductivity of approximately 0.03 W/(mK). As an example, materials may have thermal conductivities that are an order of magnitude different such that one is a thermal conductor and the other is a thermal insulator.

In FIG. 6, two approximate back side views of the nosepiece 700 are shown to the right of the system 600, which include a compact state and an extended state. In the extended state, the carrier 720 is at a greater distance from a centroid of the ball 710 than in the compact state.

As an example, an extension can include segments, threads, a combination of segments and threads, etc. For example, consider an approach where threads are utilized for an automated adjustment (e.g., a spinning element) and where segments are utilized in a manual adjustment (e.g., by a user pulling or pushing). As an example, where segments and threads are included, a nosepiece may be adjustable automatically and/or manually. As an example, threads may provide for automatic and/or manual adjustment. For example, consider a manual approach where mating threads can be elastically deformable responsive to force such that an axial adjustment may be made by reseating threads and where an automatic approach relies on rotation such that mating threads remain seated to make an axial adjustment.

In the example of FIG. 6, the ball 710 and the extension 715 may be a unit where, for example, the extension 715 is akin to a joystick that can rotate the ball 710 in a ball socket of the nosepiece coupling 670. As an example, the extension 715 may be part of the carrier 720 where the extension 715 is adjustably, axially receivable in a socket of the ball 710. As an example, the extension 715 may be received in the ball 710 and in the carrier 720 in an adjustable manner. For example, consider the ball 710 including a socket and the carrier 720 including a socket where the extension 715 can be received in part in each of the sockets.

As an example, the frame 620 in FIG. 6 can include the nosepiece coupling 670 where a ball socket may be formed integrally into the frame 620. For example, an injection molding and/or a casting process may be utilized to form a ball socket into the frame 620. As an example, a ball socket may be machined into a frame. As an example, a ball socket may be part of an attachment that can be fit to a frame. As an example, a socket may be integrally formed with a frame where the socket can receive material that forms at least a portion of a ball socket. For example, consider a liner and/or a gasket that may provide for suitable behavior with a ball to form a ball joint. In such an example, the liner and/or the gasket may be suitable for receipt of a ball via an interference fit (e.g., a press fit) where suitable friction exists such that a user may adjust the ball (e.g., to orient an extension) such that after adjustment the ball maintains its position via at least frictional force.

As shown in FIG. 6, the nosepiece coupling 670 can include a socket 671 for receipt of at least a portion of the ball 710 and a gasket recess 678 where a gasket 679 can be positioned in the gasket recess 678. In such an example, the gasket 679 may be fit into place after the ball 710 has been seated within the socket 671 such that the gasket 679 may help to secure the ball in the socket and, for example, apply a desired amount of friction to the ball (e.g., directly and/or indirectly). In such an example, the gasket 679 can be an elastomeric material or other suitable material that, for example, may be fit about the extension 715 with or without the carrier 720 fit to the extension 715. For example, consider fitting a continuous annular type of gasket about the extension 715 without the carrier 720 and then pushing it into the gasket recess 678 followed by attachment of the carrier 720, fitting a continuous annular type of gasket over the ball 710 by stretching the gasket to position the gasket between the ball 710 and the carrier 720 and then pushing it into the gasket recess 678 and/or fitting a split annular type of gasket about the extension 715 followed by pushing the gasket into the gasket recess 678. As an example, for removal, application of force to the extension 715 may be sufficient to pull the ball 710 out of the nosepiece coupling 670 along with the gasket 679 where the gasket 679 is present.

As mentioned, one or more magnets may be utilized to help stabilize a ball in a socket (e.g., stabilize a ball in a ball joint via magnetic force and/or friction generated by magnetic force, etc.). For example, consider the gasket 679 as including one or more magnets where the ball 710 and/or the nosepiece coupling 670 can include one or more magnets and/or one or more ferromagnetic materials. In such an example, magnetic force may secure the ball 710 in the nosepiece coupling 670. As an example, the gasket 679 may be a multiple piece gasket, which may provide for fitting after the ball 710 is received in the socket 671.

As shown in FIG. 6, the nosepiece coupling 670 may include a set screw 675 and a bore with mating threads 677 or other mechanism that can physically secure the ball 710 in a particular orientation with respect to the nosepiece coupling 670. For example, consider a user that positions the nosepiece 700 and then secure the position of at least the ball 710 using the set screw 675. In such an example, the set screw 675 may be accessible via a front side or a back side of the frames 620. As an example, a set screw may be a tool type of set screw and/or a tool-less type of set screw that is settable by hand without use of a tool, for example, consider a winged set screw that can be adjusted by hand without a tool. In such an example, a user may be more assured that the position of the ball 710 does not change. In such an example, where another user wants to use a headset, that user may loosen the set screw for nosepiece adjustment.

As an example, a ball may include a coded surface such that a user can note a position of the ball in a socket and, as desired, more readily return the ball to that position. For example, consider coding via lines and/or regions of latitude and/or longitude.

In FIG. 6, the nosepiece 700 is also shown in two front views along with a top view, as indicated by the z-axis. The ball 710 can include a centroid that is at an origin or displaced therefrom where the carrier 720 can be moved via rotation of the ball 710. For example, the carrier 720 may be moved to be an amount out of the x,y-plane in a forward manner and/or in a backward manner. As an example, the carrier 720 may be rotated about the y-axis and/or may be moved like a joy-stick where it is coupled to the extension 715.

Figure 7:
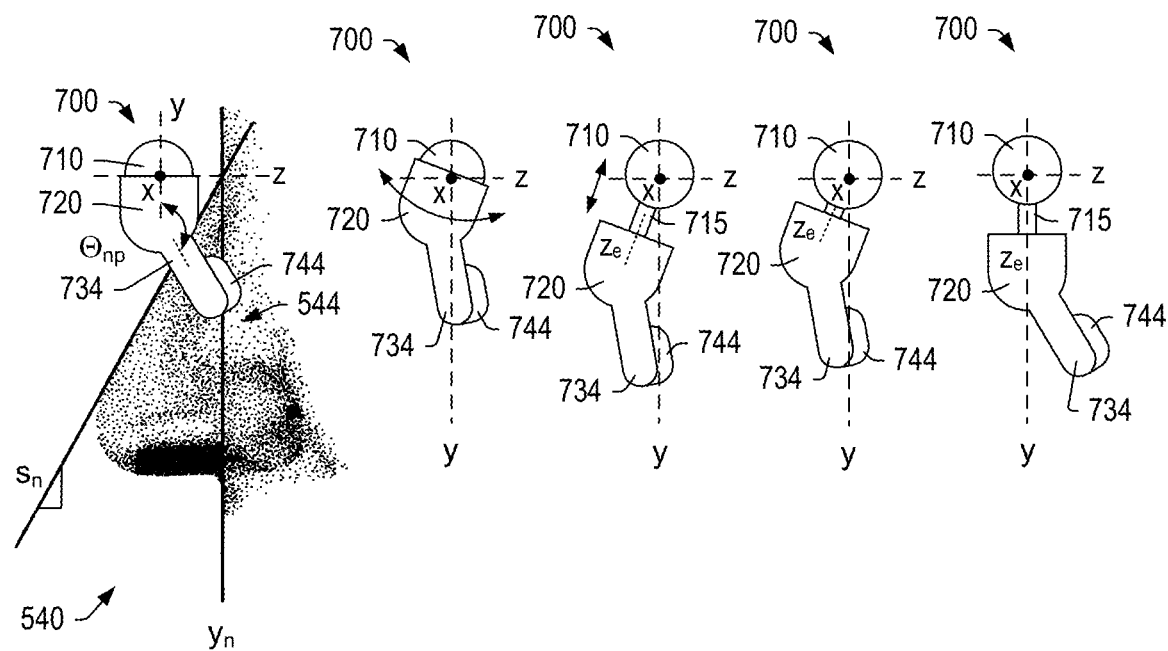
FIG. 7 is a side view of an example of a head mounted display with respect to an example of a wearer's nose and various views of an adjustable nosepiece.

FIG. 7 shows a series of side views of the nosepiece 700 with respect to the nose 540. As shown, the nosepiece 700 can swing where the carrier 720 may be in a compact state or in an extended state via the extension 715. In the example of FIG. 7, the nose axis $y_n$ is shown along with the y-axis, which can be offset or aligned with the nose axis $y_n$. As shown, the pad 734 can be adjustable for contact with one or more regions of the nose 540 where the ball 710 may be received in a ball socket of a display frame. As an example, an adjustment may aim to maintain a display frame stationary while improving wearer comfort or an adjustment may aim to move a display frame to an improved position, optionally while providing acceptable comfort for a wearer.

As shown, in the example of FIG. 7, adjustment of the extension 715 adjusts an extension axis $z_e$, which may, for example, be aligned with the y-axis or offset from the y-axis (e.g., in front of an x,y-plane and/or behind an x,y-plane). As an example, where a user may have an asymmetric nose, the carrier 720 may be rotated about the extension axis $z_e$ and/or the extension axis $z_e$ may be tilted off the y-axis to the left or to the right. As an example, the carrier 720 may be tilted to the front of the y-axis and/or to the back of the y-axis (see, e.g., FIG. 7). As shown in the example of FIG. 7, the carrier 720 can be defined by an angle $\Theta_{np}$, which can be an angle between the y-axis and one or both of the legs 732 and 734. In the example of FIG. 7, the angle $\Theta_{np}$ is greater than approximately 90 degrees and less than approximately 180 degrees. As shown, the angle $\theta_{np}$ provide for positioning the ball 710 in front of the nasion and/or the root of the nose 540 where the legs 732 and 734 extend back past the nasal ridge. As shown, the carrier 720 may be shaped with a curved surface such that an edge or edges do not contact the nose 540. As an example, the nosepiece 700 may be made with smooth surfaces, particularly for surfaces that are close to the nose and may contact the nose. Referring again to FIG. 6, as shown, the angle $\phi_{np}$ may be, for example, in a range of approximately 30 degrees to approximately 130 degrees. As an example, a relationship can exist between the angles $\Theta_{np}$ and $\phi_{np}$. As shown, the nosepiece 700 can have a shape such as an upside down Y shape or, for example, a ball with braches where a trunk can be adjustable to adjust a distance from the ball to the branches.

As shown in FIG. 6 and FIG. 7, the nosepiece 700 can provide various degrees of freedom (DOF) of adjustable movement, which can improve a wearer's experience in utilizing a head mounted display, which may be a VR headset.

Figure 8A:
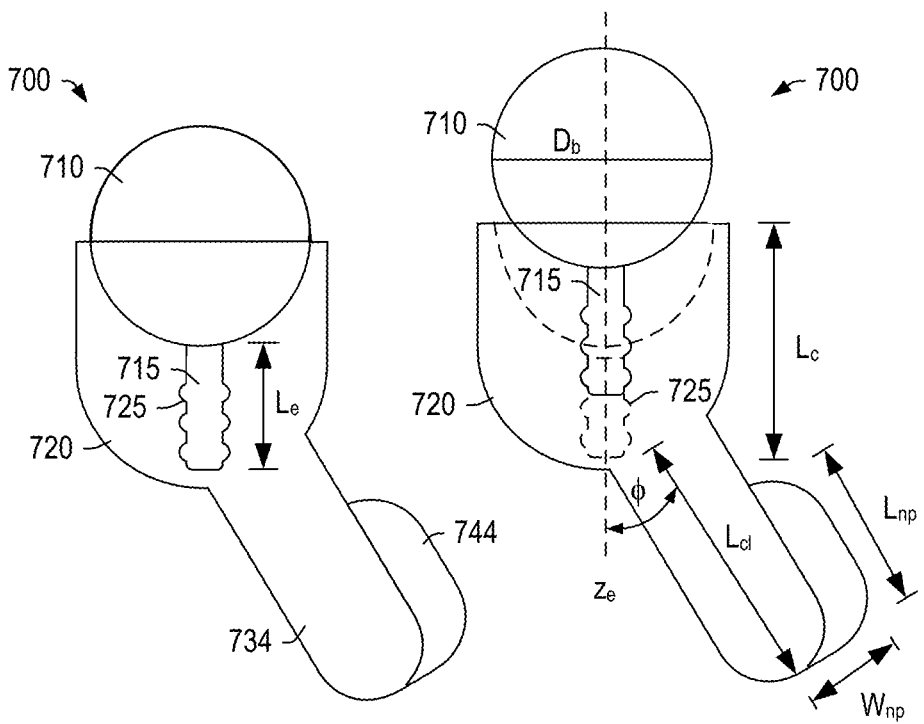
FIG. 8A and FIG. 8B are cross-sectional views of examples of a nosepiece.
Figure 8B:
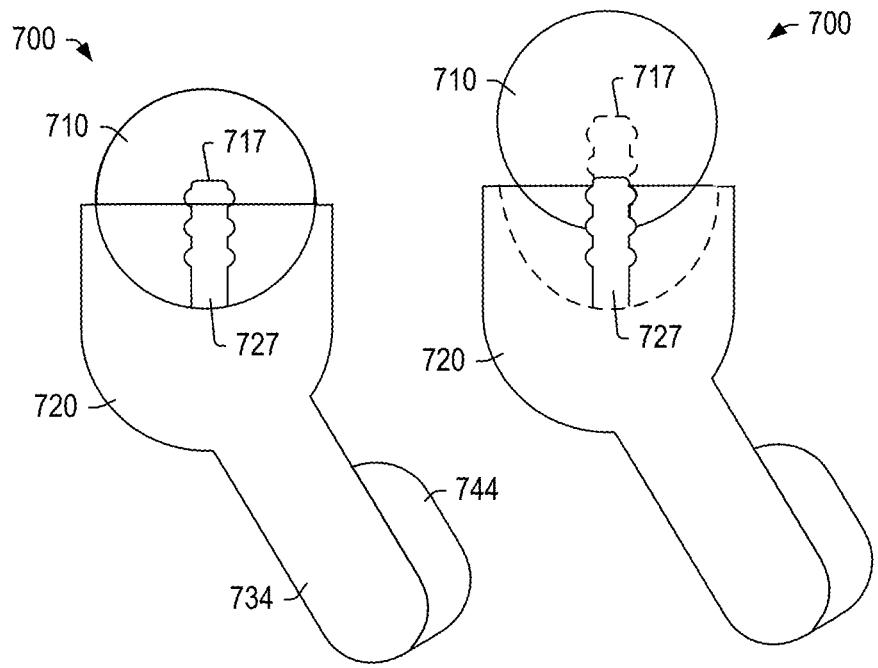

FIG. 8A and FIG. 8B show examples of the nosepiece 700 where, in FIG. 8A, the ball 710 and the extension 715 move in unison for adjustment of the carrier 720 and where, in FIG. 8B, the carrier 720 and an extension 727 move in unison for adjustment of the carrier 720. As shown in FIG. 8A, the carrier 720 includes a socket 725 for receipt of the extension 715 while, as shown in FIG. 8B, the ball 710 includes a socket 717 for receipt of the extension 727. As mentioned, an extension can include segments, threads, etc., which can provide for axial adjustment and securing a carrier in a desired axial position with respect to a ball.

In the example of FIG. 8A, various examples of dimensions are shown, including a ball dimension $D_b$, an extension dimension $L_e$, a carrier dimension $L_c$, a left nose pad portion dimension $L_{cl}$, an angle $\phi$ that can be defined with respect to an extension axis $z_e$, a nose pad length $L_{np}$ and a nose pad width $W_{np}$, noting that a nose pad can be defined in part by a depth. In the example of FIG. 8A, the angle $\phi$ and the angle $\Theta_{np}$ of FIG. 7 may sum to approximately 180 degrees.

Nose pad sizes may be defined using a long vertical dimension from top to bottom in millimeters (see, e.g., $L_{np}$). For example, consider standard nose pad sizes of 9 mm, 11 mm, 13 mm, and 15 mm. As an example, the nose pad 744 may have a dimension $L_{np}$ that may be in a range of approximately 5 mm to approximately 25 mm. As an example, the nose pad 744 may have a dimension $W_{np}$ that may be in a range of approximately 3 mm to 20 mm. As an example, the nose pad 744 may have a depth in a range of approximately 0 mm (e.g., consider a nose pad that is integral with the carrier 720) to approximately 10 mm.

As an example, a carrier can include a single piece that includes right and left nose pads. For example, consider a substantially U-shaped piece that includes a right nose pad and a left nose pad.

As mentioned, a nose pad or nose pads of a nosepiece may be replaceable. As an example, a nose pad may be fit via a socket to a portion of a carrier. For example, consider a carrier that includes a prong where an elastomeric nose piece can be press fit to the prong where some amount of movement may be provided via a joint formed by the socket and the prong. As an example, a nose pad may be made of an elastomeric polymer such as, for example, silicone.

In the example of FIG. 8A, the angle $\phi$ is approximately 32 degrees (e.g., the angle $\Theta_{np}$ is approximately 148 degrees). As illustrated in FIG. 7, the ball 710 can provide for adjustment of the extension 715 such that the carrier 720 can be adjusted for fitting the nose pads 744 acceptably on a nose. As shown, adjustment of the extension 715 adjusts the extension axis $z_e$, which may, for example, be aligned with the y-axis or offset from the y-axis (e.g., in front of an x,y-plane and/or behind an x,y-plane).

Figure 9A:
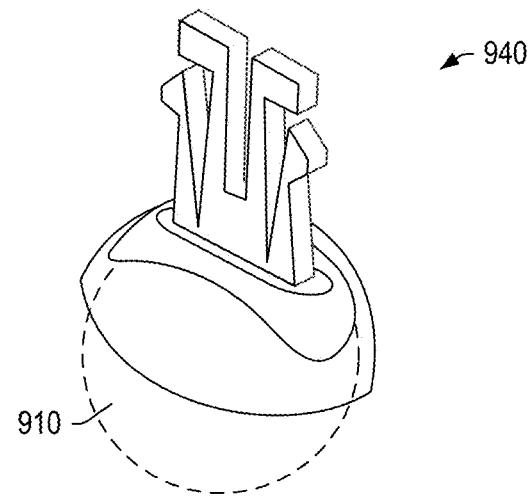
FIG. 9A and FIG. 9B are perspective views of examples of nosepiece couplings.
Figure 9B:
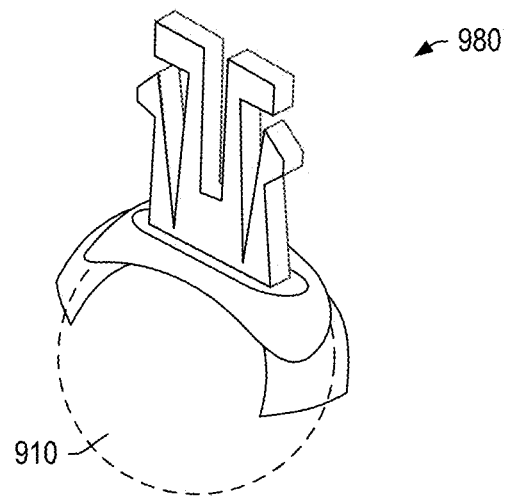

FIG. 9A and FIG. 9B show examples of nosepiece couplings 940 and 980 with respect to a ball 910, which may be part of a nosepiece such as the nosepiece 700, etc. As shown, the nosepiece couplings 940 and 980 can include at least a portion of a ball socket, which may be sufficiently sized to accommodate a ball for securing the ball in an adjustable manner. In the examples of FIG. 9A and FIG. 9B, the nosepiece couplings 940 and 980 are shown with prongs such as, for example, the prongs of the nosepieces 150-1, 150-2, 150-3 and 150-4 of FIG. 3. As an example, one or more of the nosepiece couplings 940 and 980 may include one or more of the features of the nosepiece coupling 670 of FIG. 6.

Figure 10:
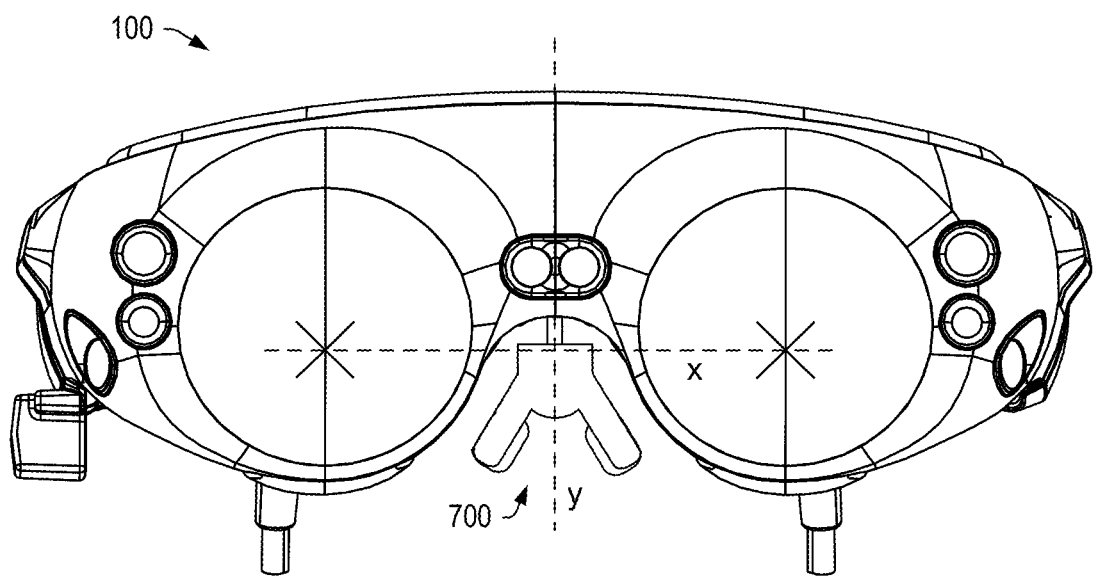
FIG. 10 is a front view of an example of a head mounted display with an example of an adjustable nosepiece.

FIG. 10 shows an example of the VR headset 100 with the nosepiece 700, which may be fit to the VR headset 100 using a nosepiece coupling such as, for example, one of the nosepiece couplings 940 and 980 of FIG. 9A and FIG. 9B, respectively.

As an example, a headset can include at least one display; virtual reality circuitry operatively coupled to the at least one display; and a display frame that includes a nosepiece coupling and a nosepiece received in part by the nosepiece coupling, where the nosepiece includes a ball, an extension, a carrier and nose pads coupled to the carrier, where the carrier is rotatable via the ball and translatable via the extension. In such an example, the nosepiece coupling can include a ball socket that receives at least a portion of the ball.

As an example, an extension of a nosepiece can include at least one enlarged segment, for example, consider a ball that includes a socket that adjustably receives the extension where, for example, at least one of the extension and the ball includes a resilient, elastically deformable material. As an example, a carrier can include a socket that adjustably receives an extension that includes at least one enlarged segment where, for example, at least one of the extension and the carrier includes a resilient, elastically deformable material.

As an example, a nosepiece can include nose pads that are removable from a carrier. In such an example, the carrier can be formed of a first material and the nose pads can be formed of a second, different material.

As an example, a nosepiece coupling and ball can form a ball joint. In such an example, the nosepiece coupling can include at least a semi-spherical socket for receipt of at least a portion of the ball where, for example, the ball is interference fit into the at least semi-spherical socket.

As an example, a carrier can be rotatable via a ball responsive to application of force to the ball that is greater than a frictional force.

As an example, a carrier can be translatable via an extension responsive to application of force that is greater than an elastic, deformation force. As an example, a carrier can be translatable via an extension responsive to application of force that is greater than a frictional force.

As an example, a headset can include a frame that includes a keyway and a nosepiece coupling that includes a key receivable at least in part in the keyway.

As an example, a headset can include a sensor that detects at least one of a rotational position of a nosepiece and a translational position of the nosepiece. In such an example, the sensor can detect position of a ball where the position of the ball determines a position of an extension (e.g., in a spherical or hemispherical coordinate system, etc.). As an example, a headset can include memory that stores positional information of a nosepiece based at least in part on a sensor generated signal.

As an example, a headset can include a nosepiece with a right nose pad and a left nose pad where a carrier includes a right nose pad portion for the right nose pad and a left nose pad portion for the left nose pad. In such an example, the portions may be legs with one or more features to support corresponding nose pads.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A headset comprising:
   at least one display;
   virtual reality circuitry operatively coupled to the at least one display; and
   a display frame that comprises a nosepiece coupling and a nosepiece received in part by the nosepiece coupling, wherein the nosepiece comprises a ball, an extension, a carrier and nose pads coupled to the carrier, wherein the carrier is rotatable via the ball and translatable via the extension, wherein the nosepiece coupling and the ball form a ball joint, wherein the nosepiece coupling comprises a ball socket that receives at least a portion of the ball, wherein the carrier is adjustably translatable, via the extension, a selectable distance from a center of the ball, and wherein the carrier is rotatable via the ball in at least one plane that passes through the center of the ball.

2. The headset of claim 1, wherein the extension comprises at least one enlarged segment.

3. The headset of claim 2, wherein the ball comprises a socket that adjustably receives the extension.

4. The headset of claim 3, wherein at least one of the extension and the ball comprises a resilient, elastically deformable material.

5. The headset of claim 2, wherein the carrier comprises a socket that adjustably receives the extension.

6. The headset of claim 5, wherein at least one of the extension and the carrier comprises a resilient, elastically deformable material.

7. The headset of claim 1, wherein the nose pads are removable from the carrier.

8. The headset of claim 7, wherein the carrier is formed of a first material and wherein the nose pads are formed of a second, different material.

9. The headset of claim 1, wherein the ball socket comprises at least a semi-spherical socket for receipt of at least a portion of the ball.

10. The headset of claim 9, wherein the ball is interference fit into the at least semi-spherical socket.

11. The headset of claim 1, wherein the carrier is rotatable via the ball responsive to application of force to the ball that is greater than a frictional force.

12. The headset of claim 1, wherein the carrier is translatable via the extension responsive to application of force that is greater than an elastic, deformation force.

13. The headset of claim 1, wherein the carrier is translatable via the extension responsive to application of force that is greater than a frictional force.

14. The headset of claim 1, wherein the frame comprises a keyway and the nosepiece coupling comprises a key receivable at least in part in the keyway.

15. The headset of claim 1, comprising a sensor that detects at least one of a rotational position of the nosepiece and a translational position of the nosepiece.

16. The headset of claim 15, wherein the sensor detects position of the ball wherein the position of the ball determines position of the extension.

17. The headset of claim 15, comprising memory that stores positional information of the nosepiece based at least in part on a sensor generated signal.

18. The headset of claim 1, wherein the nose pads comprise a right nose pad and a left nose pad and wherein the carrier comprises a right nose pad portion for the right nose pad and a left nose pad portion for the left nose pad.

* * * * *